(12) United States Patent
Dayan

(10) Patent No.: US 9,021,438 B2
(45) Date of Patent: Apr. 28, 2015

(54) AUTOMATIC FRAMEWORK FOR PARALLEL TESTING ON MULTIPLE TESTING ENVIRONMENTS

(71) Applicant: Nir Dayan, Ra'anana (IL)

(72) Inventor: Nir Dayan, Ra'anana (IL)

(73) Assignee: SAP Portals Israel Ltd, Ra'anana (IL)

( * ) Notice: Subject to any disclaimer, the term of this patent is extended or adjusted under 35 U.S.C. 154(b) by 0 days.

(21) Appl. No.: 13/922,788

(22) Filed: Jun. 20, 2013

(65) Prior Publication Data

US 2014/0380278 A1 Dec. 25, 2014

(51) Int. Cl.
*G06F 9/44* (2006.01)
*G06F 11/36* (2006.01)

(52) U.S. Cl.
CPC .................................. *G06F 11/3692* (2013.01)

(58) Field of Classification Search
USPC ........................................................ 717/124
See application file for complete search history.

(56) References Cited

U.S. PATENT DOCUMENTS

| | | | | |
|---|---|---|---|---|
| 5,371,883 A * | 12/1994 | Gross et al. | ................... | 714/38.1 |
| 6,601,018 B1 * | 7/2003 | Logan | ............................ | 717/124 |
| 6,701,514 B1 * | 3/2004 | Haswell et al. | ................ | 717/124 |
| 7,694,181 B2 * | 4/2010 | Noller et al. | ................ | 714/38.11 |
| 8,549,522 B1 * | 10/2013 | Chatterjee et al. | ............ | 718/102 |
| 2005/0022194 A1 * | 1/2005 | Weir et al. | ...................... | 718/100 |
| 2005/0229162 A1 * | 10/2005 | Tanner, Jr. | ..................... | 717/126 |
| 2006/0037002 A1 * | 2/2006 | Vinberg et al. | ................ | 717/124 |
| 2006/0070034 A1 * | 3/2006 | Balfe et al. | ...................... | 717/124 |
| 2007/0220341 A1 * | 9/2007 | Apostoloiu et al. | ............. | 714/33 |
| 2007/0245199 A1 * | 10/2007 | Pochowski | ....................... | 714/742 |
| 2008/0307036 A1 * | 12/2008 | Mishra et al. | .................. | 709/203 |
| 2009/0249216 A1 * | 10/2009 | Charka et al. | .................. | 715/744 |
| 2009/0254572 A1 * | 10/2009 | Redlich et al. | ................... | 707/10 |
| 2010/0318974 A1 * | 12/2010 | Hrastnik et al. | ............... | 717/135 |
| 2011/0289489 A1 * | 11/2011 | Kumar et al. | .................. | 717/135 |
| 2012/0159468 A1 * | 6/2012 | Joshi et al. | ...................... | 717/172 |

OTHER PUBLICATIONS

Romanski, "Management of Configuration Data in an IMA System", 2008, IEEE.*
Hanawa et al., "Large-Scale Software Testing Environment using Cloud Computing Technology for Dependable Parallel and Distributed Systems", 2010, IEEE.*

(Continued)

*Primary Examiner* — Anna Deng
*Assistant Examiner* — Junchun Wu

(57) ABSTRACT

A web application is tested on multiple testing environments provided by testing appliances. The testing environments are described by a platform, managing an appliance, a browser used for loading the web application, and a browser version. An automatic testing framework is used for handling the parallelized test execution on all of the testing environments. Within the testing framework the testing environments are defined and prepared for the test execution. A consolidated configuration file is generated for the web application's configuration and the tests classes. The testing framework provides a local server to host the web application which is later loaded in the testing environments. The testing framework processes the test and uses a communication with the appliances to send commands and to execute the test on all of the testing environments. A unified test report is generated that accumulates the results from all of the testing environments.

17 Claims, 8 Drawing Sheets

(56) References Cited

OTHER PUBLICATIONS

Duarte et al., "Multi-Environment Software Testing on the Grid", 2006, ACM.*

Tsai et al., "Scenario-Based Object-Oriented Test Frameworks for Testing Distributed Systems", 2003, IEEE.*

* cited by examiner

AUTOMATIC FRAMEWORK FOR PARALLEL TESTING ON MULTIPLE TESTING ENVIRONMENTS

BACKGROUND

A software development life-cycle process imposes a structure for the development of software products. There are different models for such processes describing possible approaches for tackling tasks and activities. The activities may include development planning, implementation, testing, preparing the product documentation, etc. The life-cycle process may be designed with consideration to the type of software product that is developed and specific customers' usage. A structured approach for developing applications, e.g. a web application, may increase the quality of the product, the customers' satisfaction, and the sales revenues. One aspect of delivering web application is the process of comprehensive testing. When discussing web application different software devices with their platforms and installed web browsers are taken into consideration. Desktop computers, laptops, and mobile devices are generally managed by an operating system. For example, a mobile device may have an operating system such as iOS (Apple Inc.) or Windows® Phone (Microsoft Inc.) or Android™ (Google Inc.). There are a number of browsers that target users of a web application may use, when loading the application on a preferred device. The testing process may ensure a consistent user experience with different browsers installed on different platforms.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for an automatic framework for parallel testing on multiple testing environments are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In the web applications world the number of platforms, browser vendors, and versions are increasing at a tremendous pace. More and more devices spread quickly in the market and each device supply a different web browser with a different version. Some of the devices support more than one browser type. In one aspect, web developers become challenged to test their web applications, which may support vast number of browsers types and versions, installed on different platforms and devices in order to supply the customers with high quality products. The web applications may be tested on different platforms, both on mobile and desktop devices, with browsers having different types and versions, e.g. Google® Chrome™, Mozilla® Firefox, Microsoft® Internet Explorer®, Safari® (Apple Inc.), Opera™ (Opera Software Inc.), etc. When testing the application, all required devices, platforms, browsers with different versions, etc. may be taken into consideration. Furthermore, a developer usually has to pre-install and configure each browser and device for test execution. This is hard work, which takes lots of time and power. In one embodiment, the tests on different device-platform-browser configurations (i.e. testing environments) may be executed one after another, which may take a lot of time. In another embodiment, the tests may be executed automatically in parallel on all the defined required testing environments.

Figure 1:
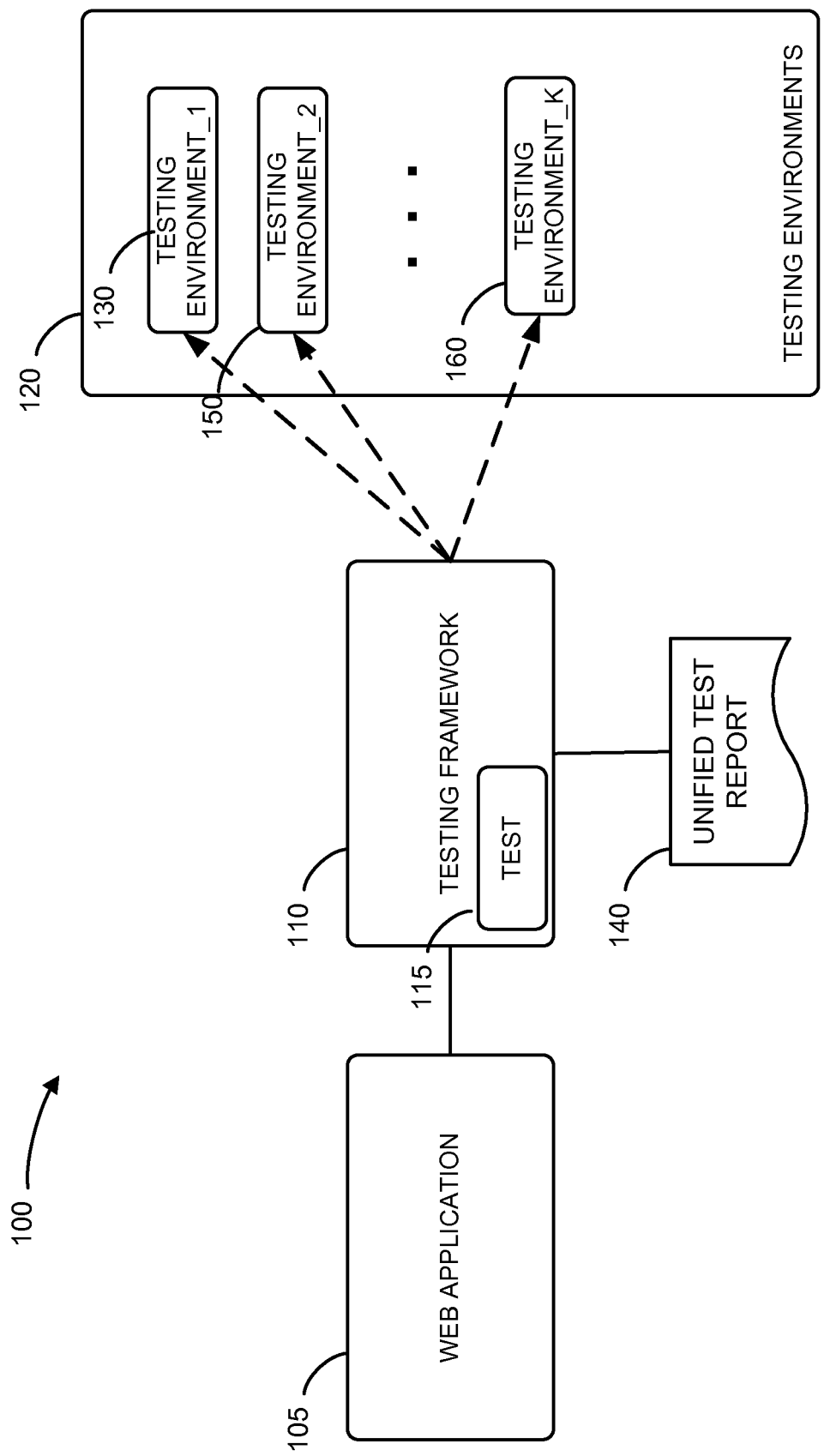
FIG. 1 is a block diagram illustrating an embodiment of an environment for testing a web application on multiple testing environments.

FIG. 1 is a block diagram illustrating an embodiment of an environment 100 for testing a web application 105 on multiple testing environments 120. The web application 105 is developed, for example in a development environment. In one embodiment, the web application 105 is tested on the testing environments 120 through a testing framework 110. The testing environments 120 may be a simulated or real environment that corresponds to customers' environments targeted by the web application 105. In one embodiment, a testing environment may be defined by the type of the device, which is used for consuming the web application, the platform working on the device, together with a browser for accessing the web application. One browser type may have a number of versions released to customers that are maintained and different customers may use different versions. This fact may impose the need of testing the web application not only on a version of a web browser, but on all versions that a target user may use for accessing the web application. For example, a testing environment 130 may be an environment having an operating system—Microsoft® Windows 7, a browser—Microsoft® Internet Explorer®, with a browser version 9.

In one embodiment, the testing framework 110 may execute a test 115 on all testing environments 120—the testing environment_1 130, testing environment_2 150, testing environment_k 160, etc. The execution of the test may happen in parallel against all testing environments 120, i.e. against the combination of a device, a platform, a browser, and a browser version. As a result, a unified test report 140 may be generated to accumulate the test results from all of the testing environments 120.

Figure 2:
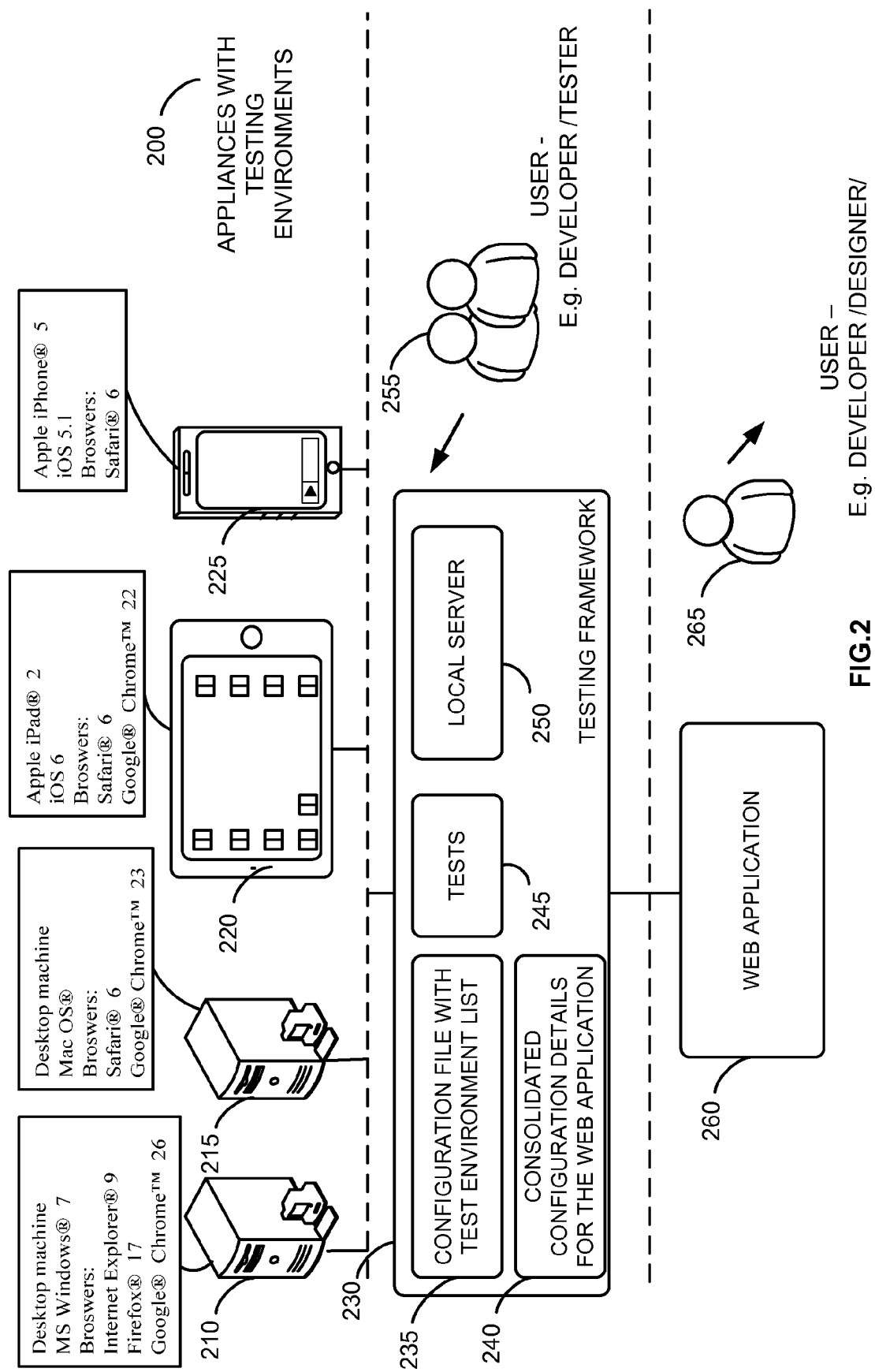
FIG. 2 is a block diagram illustrating an embodiment of a testing framework for testing a web application on multiple testing environments.

FIG. 2 is a block diagram illustrating an embodiment of a testing framework 230 for testing a web application 260 on multiple testing environments. In one embodiment, the multiple testing environments may be provided by appliances 200, such as computer appliances, that represent hardware devices with integrated software that provide computing resources. For example, the appliances 200 may be desktop machines, laptops, mobile devices (telephones, tablets, notebooks, etc.), and virtual machine appliances. The virtual machine appliances may include a layer where operating systems and application may be loaded. In one embodiment, the web application 260 may be designed and developed by a user 265. The testing framework 230 may be used by another user 255, which may be in a role of a developer or a tester for the web application 260.

In one embodiment, the testing framework 230 may be an automation framework for web applications, which executes automatic tests against unlimited number of browsers in parallel and delivers a unified test report with test status for each browser, such as the unified test report 140. The user 255 may write once an automatic test with a preferred programming language, and executes it in parallel against all appliances 200 with the testing environments the user needs and may get one unified report in a short time. The testing environments may be described and differentiated by the type of the devices, the platforms, the browsers, and the browser versions. For example, the user 255 may define tests within a tests 245 module in the testing framework 230. The developer 255 defines in a configuration file 235, which platform, browser type, and browser version he wants his test to be executed against. Table 1 presents a combination of a platform, a browser type and version that may define a testing environment. For example, one of the testing environments defined in Table 1 is a computing device having Microsoft® Windows as an operating system, Internet Explorer® 9 as the specific browser used for loading the web application. In one embodiment, one or more testing environments may be provided from one appliance. For example, appliance 210 is a desktop computing machine, having an operating system Microsoft Windows 7, with 3 browsers with different browser version installed—Internet Explorer® 9, Firefox® 17, Google® Chrome™ 26. Therefore, on the appliance 210 there are 3 testing environments, the first environment is the one defined by the operating system MS Windows 7, Internet Explorer® is the browser type, and the version of the browser is 9. The second and the third testing environments are accordingly—Microsoft® Windows 7, Internet Explorer® as the browser type, with version of the browser—7; and Microsoft® Windows 7, Google® Chrome™ as the browser type, with version of the browser—26.

TABLE 1

| Platform | Browser Type | Browser Version |
| --- | --- | --- |
| Windows ® | Internet Explorer ® | 9 |
| Mac ® with Mac OS ® | Safari ® | 6 |
| iPhone ® 5 with iOS 5.1 | Safari ® | 5 |
| Android ™ Galaxy Tab ™ | Chrome ™ | 22 |

Appliance 215, which is a desktop machine, provides two testing environments—Mac OS®, Safari® browser, version 6; and Mac OS®, Google® Chrome™ 23, version 9. Appliance 220, which is an Apple iPad® 2, provides two testing environments—iOS 6, Safari® browser, version 6; and iOS6, Google® Chrome™ version 22. Appliance 225 is an iPhone® 5 (Apple Inc.), providing one testing environment—iOS 5.1, browser type—Safari®, browser version 6. The possible appliances that may provide testing environments are not limited to the described exemplary appliances 210, 215, 220, and 225. One device may provide more than one platform and therefor, the number of testing environments provided by that device may exceed proportionally. In one embodiment, the testing environments may be provided from real devices or browsers, like the example with iPhone® 5 with the Safari® browser. In another embodiment, the devices and browsers may be simulated. For example, an Android™ operating system may be simulated with different screen resolutions and browser versions.

In one embodiment, the user 255 may write a test and store it in the tests 245 module. The testing environments and the included browsers may load the web application. The test may be executed against the testing environments provided by the appliances 200 in parallel. In such manner, during the test execution, each browser that is part of the testing environments is being tested in a different thread with no influence of other browsers threads. As a result from the parallel automatic testing, the unified report is generated with test tracking for each browser with the status of the test. If there was an error on some test execution, it will be described in detail in the test report.

The file structure of a development project consists of many files, including configuration files, which define the code sources to be loaded. In addition, there are configuration files that also define, which test classes to be executed. For example, the configuration files may be in an Extensible Markup Language (XML) format, JavaScript Object Notation (JSON) format, etc. The testing framework 230 provides a mechanism to unify the configuration files from the web application 265 and the configuration files that define the test classes to be executed. The unification mechanism may also resolve duplications and dependencies that exist in the configuration files. In one embodiment, a consolidated configuration details 240 are generated. Table 2 presents an exemplary consolidated configuration file. The unification mechanism uses an algorithm to explore the development project file structure, and to find relevant configuration files and "compile" them to a new unified configuration file. In one embodiment, the user 255, which may be a developer, has an option to define which configuration files he wants the mechanism to unify and which not.

TABLE 2 load:
- ..\..\..\..\externals\jasmine-1.1.0.js
- ..\..\..\..\externals\JasmineAdapter-1.1.2.js
- ..\..\..\..\externals\jasmine-toEqualProperties.js
- ..\..\..\..\..\externals\es3shims\object.getprototypeof.js
- ..\..\..\..\..\externals\es5shims\array.prototype.indexof.js
- ..\..\..\..\..\externals\es5shims\array.prototype.lastindexof.js
- ..\..\..\..\..\externals\es5shims\function.prototype.bind.js
- ..\..\..\..\..\externals\ember.js\lib\jquery-1.7.2.js
- ..\..\..\..\..\externals\ember.js\lib\handlebars-1.0.rc.1.js
- ..\..\..\..\..\externals\ember.js\dist\ember.js
- ..\..\..\..\..\externals\requirejs\require.js
- ..\..\..\..\..\require-uc-config.js
- ..\..\..\..\..\src\core\lib\uc.js
- ..\..\..\..\..\src\core\lib\PropertiesProcessor.js
- ..\..\..\..\..\src\core\lib\View.js
- ..\..\..\..\..\src\core\lib\Collection.js TABLE 2-continued

- ..\..\..\..\..\..\src\core\lib\ComponentCollection.js
- ..\..\..\..\..\..\src\core\lib\Component.js
- ..\..\..\..\..\..\src\core\lib\LayoutCollections.js
- ..\..\..\..\..\..\src\core\lib\Layout.js
- ..\..\..\..\..\..\src\core\lib\LayoutInterface.js
- ..\..\..\..\..\..\src\plugins\gridlayout\lib\GridLayout.js
- ..\..\..\..\..\..\src\core\lib\Entity.js
- ..\..\..\..\..\..\src\core\lib\EntityCollection.js
- ..\..\..\..\..\..\src\core\lib\Header.js
- ..\..\..\..\..\..\src\core\lib\Page.js
- ..\..\..\..\..\..\src\core\lib\Footer.js
- ..\..\..\..\..\..\src\core\lib\Widget.js
- ..\..\..\..\..\..\src\core\lib\Site.js
test:
- ..\..\..\..\..\..\src\plugins\gridlayout\tests\GridLayout.js
- ..\..\..\..\..\..\src\core\tests\uc.js
- ..\..\..\..\..\..\src\core\tests\PropertiesProcessor.js
- ..\..\..\..\..\..\src\core\tests\View.js
- ..\..\..\..\..\..\src\core\tests\Collection.js
- ..\..\..\..\..\..\src\core\tests\ComponentCollection.js
- ..\..\..\..\..\..\src\core\tests\Component.js
- ..\..\..\..\..\..\src\core\tests\LayoutCollections.js
- ..\..\..\..\..\..\src\core\tests\Layout.js
- ..\..\..\..\..\..\src\core\tests\LayoutInterface.js
- ..\..\..\..\..\..\src\core\tests\Entity.js
- ..\..\..\..\..\..\src\core\tests\EntityCollection.js
- ..\..\..\..\..\..\src\core\tests\Header.js
- ..\..\..\..\..\..\src\core\tests\Page.js
- ..\..\..\..\..\..\src\core\tests\Footer.js
- ..\..\..\..\..\..\src\core\tests\Widget.js
- ..\..\..\..\..\..\src\core\tests\Site.js In some embodiment, browsers are lacking Cascading Style Sheets (CSS) and Javascript resources and there is a need to pre-download them to the testing environment in order to execute tests. In one embodiment, the testing framework 230 may automatically identify the target browsers defined in the configuration file 235 and decide if and what resources to download for the test. Due to this process the developer is free of hard work of providing and installing needed resources by the testing environments, and more specifically the browsers installed. The web pages of the web application 260 may be hosted on an application server. In one embodiment, the web pages may be hosted on a local server 250. The local server 250 may be a local Hypertext Transfer Protocol (HTTP) server that may serve the web application on HTTP protocol. The testing framework 230 may automatically launch the local server 250 and publish the web application 260. If a local server 250 is used, then there is no leaning on external HTTP servers, because they may be down and out of date with the latest developer code lines. In one embodiment, a test from the tests 245 may be executed against both desktop and mobile browsers. The execution of the tests 245 may be an automated process and there may be no difference in the execution flow on different browsers. The testing environments used for the test execution may be provided from the appliances 200.

Figure 3:
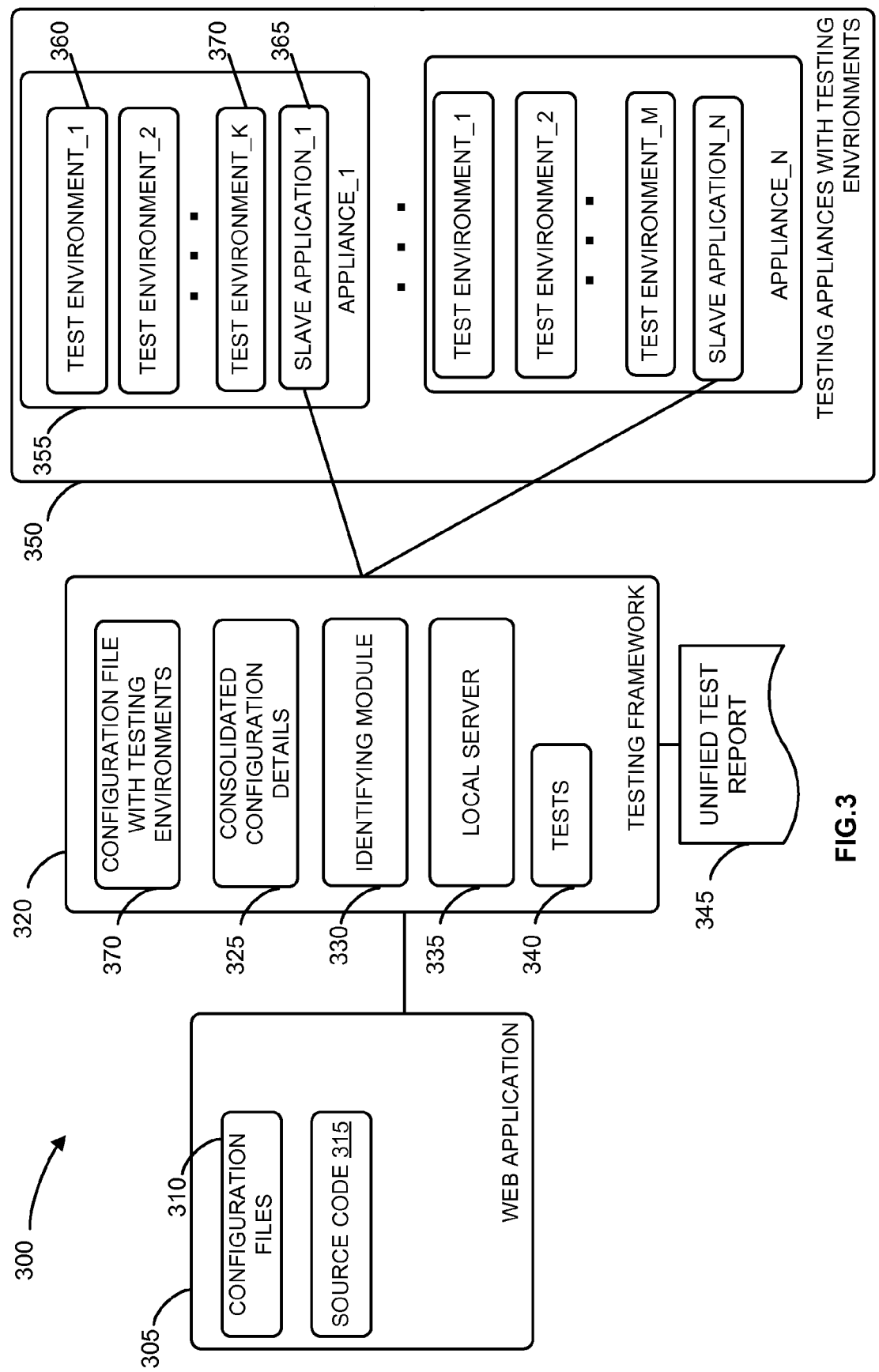
FIG. 3 is a block diagram illustrating an embodiment of a testing framework for testing web applications on multiple testing environments provided by testing appliances.

FIG. 3 is a block diagram illustrating an embodiment 300 of a testing framework 320 for testing web applications on multiple testing environments provided by testing appliances 350. In one embodiment, the testing process may be executed over a web application 305 that includes source code 315 and configuration files 310. In one embodiment, the web application 305 may be developed in a development environment, such as the Eclipse® development environment, which is a multi-language Integrated Development Environment (IDE). The testing framework 320 may be integrated with the development environment and a developer may write tests 340 there. The testing environment 320 may include a local server 335, such as the local server 250 in FIG. 2. The testing framework 320 may provide an automatic mechanism to unify the configuration files 310, which define the source code 315 to be loaded and test classes from a test of the test 340 to be executed. The result of the unification may be defined in a file, such as consolidated configuration details 325 file.

In one embodiment, the testing framework 320 may have a configuration file 370, where a developer may define testing environments that are targeted for the test execution. The definition of a testing environment may be defined in an XML file and includes details such as but not limited to a device type, an operating system, a browser type, and a browser version. In one embodiment, the testing appliances 350 may provide the testing environments. For example, appliance_1 355 may correspond to an appliance from the appliances 200 with testing environments in FIG. 2. In one embodiment, the configuration file 370 may further include the definition of the test classes from the test targeted for execution on the different testing environments. Table 3 presents an embodiment of an XML file of an exemplary configuration file 370 that includes a list of testing environments and testing classes. In such manner, when using the testing framework 320, it may be configured which test classes to be executed on each browser from the testing environments on the testing appliances 350.

TABLE 3

```xml
<?xml version="1.0" encoding="UTF-8" ?>
    <!DOCTYPE suite (View Source for full doctype...)>
- <suite name="All Tests Suite" parallel="tests" junit="false"
configfailurepolicy="skip" thread-count="5"
skipfailedinvocationcounts="false" data-provider-thread-count="10"
group-by-instances="false" preserve-order="true"
allow-return-values="false">
    <parameter name="hub" value="ILTLVW1261.dhcp.tlv.sap.corp" />
- <!--
    Here you define hub host to connect to all browsers
    -->
- <test name="Firefox" junit="false"
skipfailedinvocationcounts="false" preserve-order="true"
group-by-instances="false" allow-return-values="false">
    <parameter name="browser" value="firefox" />
    <parameter name="platform" value="WINDOWS" />
    <parameter name="version" value="17" />
- <classes>
    <class name="com.sap.ushell.tests.Panel" />
    <class name="com.sap.ushell.tests.Button" />
    <class name="com.sap.ushell.tests.LoginScreen" />
    <class name="com.sap.ushell.tests.NavigationBar" />
    <class name="com.sap.ushell.tests.StatusBar" />
    </classes>
    </test>
- <test name="chrome" junit="false"
skipfailedinvocationcounts="false" preserve-order="true"
group-by-instances="false" allow-return-values="false">
    <parameter name="browser" value="chrome" />
    <parameter name="platform" value="WINDOWS" />
    <parameter name="version" value="26" />
- <classes>
    <class name="com.sap.ushell.tests.Panel" />
    <class name="com.sap.ushell.tests.Button" />
    <class name="com.sap.ushell.tests.LoginScreen" />
    <class name="com.sap.ushell.tests.NavigationBar" />
    <class name="com.sap.ushell.tests.StatusBar" />
    </classes>
    </test>
- <test name="internet_explorer" junit="false"
skipfailedinvocationcounts="false" preserve-order="true"
group-by-instances="false" allow-return-values="false">
    <parameter name="browser" value="internet_explorer" />
    <parameter name="platform" value="WINDOWS" />
    <parameter name="version" value="9" />
- <classes>
    <class name="com.sap.ushell.tests.Panel" />
    <class name="com.sap.ushell.tests.Button" />
```

TABLE 3-continued

```
    <class name="com.sap.ushell.tests.LoginScreen" />
    <class name="com.sap.ushell.tests.NavigationBar" />
    <class name="com.sap.ushell.tests.StatusBar" />
  </classes>
 </test>
 <test name="internet_explorer" junit="false"
skipfailedinvocationcounts="false" preserve-order="true"
group-by-instances="false" allow-return-values="false">
    <parameter name="browser" value="internet_explorer" />
    <parameter name="platform" value="WINDOWS" />
    <parameter name="version" value="10" />
  <classes>
    <class name="com.sap.ushell.tests.Panel" />
    <class name="com.sap.ushell.tests.Button" />
    <class name="com.sap.ushell.tests.LoginScreen" />
    <class name="com.sap.ushell.tests.NavigationBar" />
    <class name="com.sap.ushell.tests.StatusBar" />
  </classes>
 </test>
 <test name="ipad" junit="false" skipfailedinvocationcounts="false"
preserve-order="true" group-by-instances="false"
allow-return-values="false">
    <parameter name="browser" value="Safari" />
    <parameter name="platform" value="IOS" />
    <parameter name="version" value="6" />
  <classes>
    <class name="com.sap.ushell.tests.Panel" />
    <class name="com.sap.ushell.tests.Button" />
    <class name="com.sap.ushell.tests.LoginScreen" />
    <class name="com.sap.ushell.tests.NavigationBar" />
    <class name="com.sap.ushell.tests.StatusBar" />
  </classes>
 </test>
</suite>
```

In one embodiment, the testing environments defined in Table 3 may be such as the testing environments on appliance_1 355—from testing environment_1 360 to testing environment_k 370. The testing classes defined in the configuration file presented in Table 3 may be defined in the tests 340 module from the testing framework 320. In one embodiment, the testing framework 320 may include consolidated configuration details 325, such as the consolidated configuration details 240 on FIG. 2 and the exemplary consolidated details in form of an XML file in Table 2.

The testing framework 320 may further include an identifying module 330 that determines the necessary resources for the testing environments, such as testing environment_1 360 through testing environment_k 370 on appliance_1 355. The identifying module 330 may identify the target testing environment and decide if and what resources to download for the test. The identifying modules 330 may take care for pre-installing and configuring the required resources on the testing environments. The identification process may be automated so that the process is free from users' interactions to determine required resources and manual installation on the appliances 350. The testing framework 320 communicates with the testing appliances 350 where the testing environments are persisted. The communication between the testing framework 320 and the testing environments 350 may be accomplished through pre-installed slave applications, one per appliance that may facilitate the communication between the testing framework 320 and each of the testing environments provided by an appliance. In order to control and communicate with the browsers on each appliance from the testing framework 320, a slave application has to be one-time installed. The slave application may be compatible with all the devices and platforms that may be defined as testing environments. For example, the installation of the slave application may be accomplished manually by a user. The slave application may be written in different programming languages. In one embodiment, the chosen programming language for the implementation of the slave application may be related to the appliance that the slave application is installed on.

In one embodiment, appliance_1 355 may have a slave application_1 365 that establishes a communication channel with the testing framework 320 and receives commands for the execution of a test from the tests 340 module. In one embodiment, the testing framework 320 may send commands to the slave application_1 365 to open a browser from the testing environment_1 360 and to launch the web application 305, which is hosted on the local server 335. Further, the testing framework 320 may send commands related to a specific test that is executed. In yet another embodiment, the testing framework 320 may establish communication with slave applications installed on all of the testing appliances 350 to send commands for simultaneous execution of a test. Within a command to the slave application_1 365, the testing framework 320 may suggest execution of the test on all of the testing environments provided by the appliance_1 365. As a result of the test execution, a unified test report 345 may be generated, incorporating the results of the tests on all of the testing environments from the testing appliances 350. Additionally, the testing framework 320 may clean the testing environments in a cleaning phase after the test execution in order to delete footprints or leftovers. In such manner, the testing appliances 350 may remain clean and ready for new test execution processes.

Figure 4:
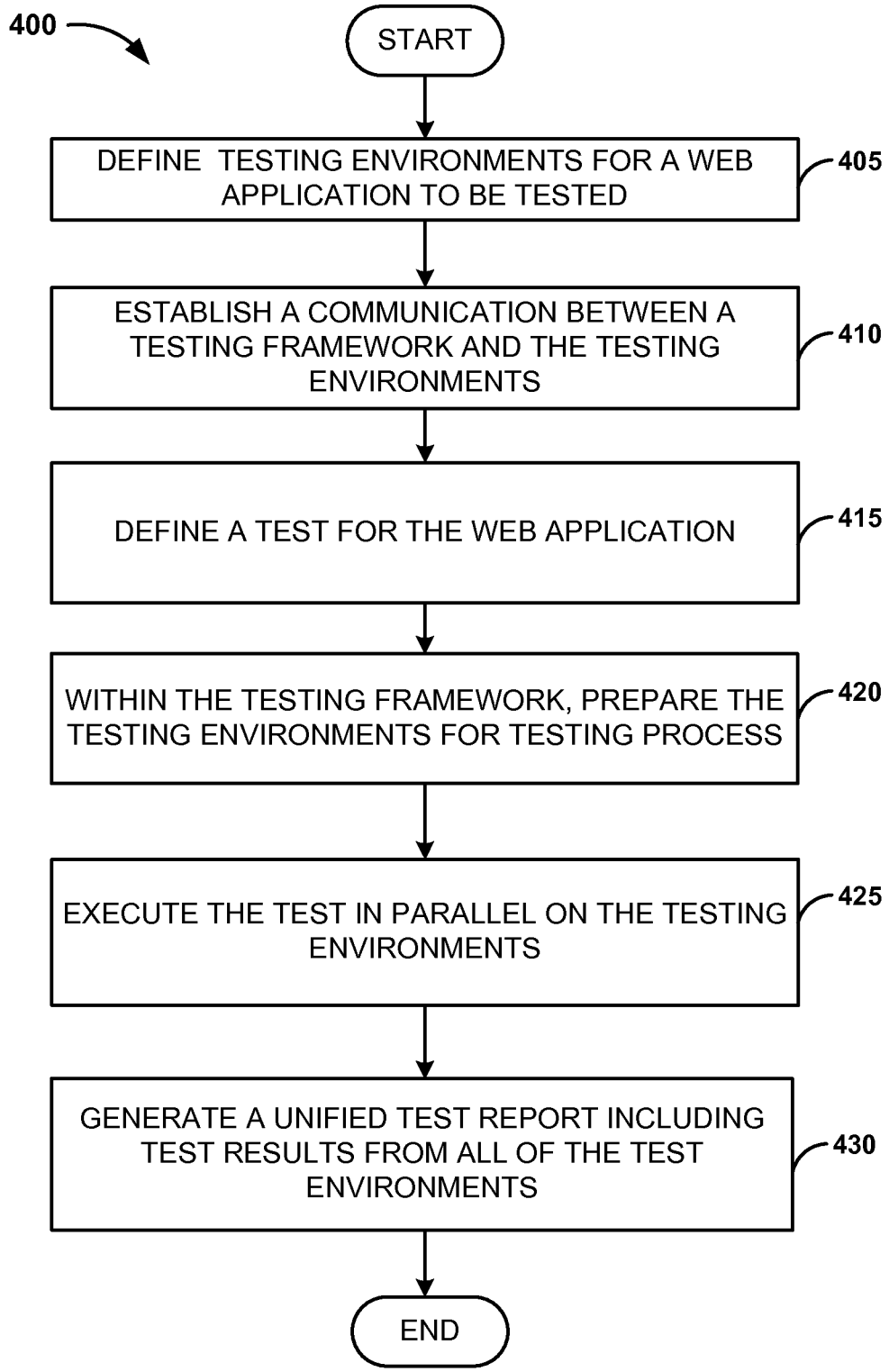
FIG. 4 is a flow diagram illustrating an embodiment of a method for automatic parallel testing of a web application.

FIG. 4 is a flow diagram illustrating an embodiment of a method 400 for automatic parallel testing of a web application. In one embodiment, the web application may be such as the web application 305 on FIG. 3. Web applications may be tested in different environments, having different platforms, browsers, and browser versions for launching the web application. At step 405 testing environments, such as testing environment_1 360, FIG. 3, are defined for the web application. In one embodiment, the testing environments may be provided from testing appliances, such as appliances 200. The testing environments may be defined from a testing framework. At step 410, the testing framework may establish a communication with the testing environments. Within the testing framework, a test for parallel execution on the testing environments may be defined at step 415. The testing framework, at step 420, may prepare the testing environments for the testing process. In one embodiment, the preparing steps may include defining of consolidated configuration details, such as details 325 at FIG. 3. Further, the preparing steps may include identification steps, such as the steps provided by the identifying module 330, FIG. 3, that determine which are the needed resources by the testing environments, pre-download them, and install them as needed on the appliances that provide the testing environments. At step 425, the testing framework may execute the defined test (at step 415) in parallel on the testing environment. As a result, at step 430, a unified test report based on the executed tests in all of the testing environments may be generated.

Figure 5:
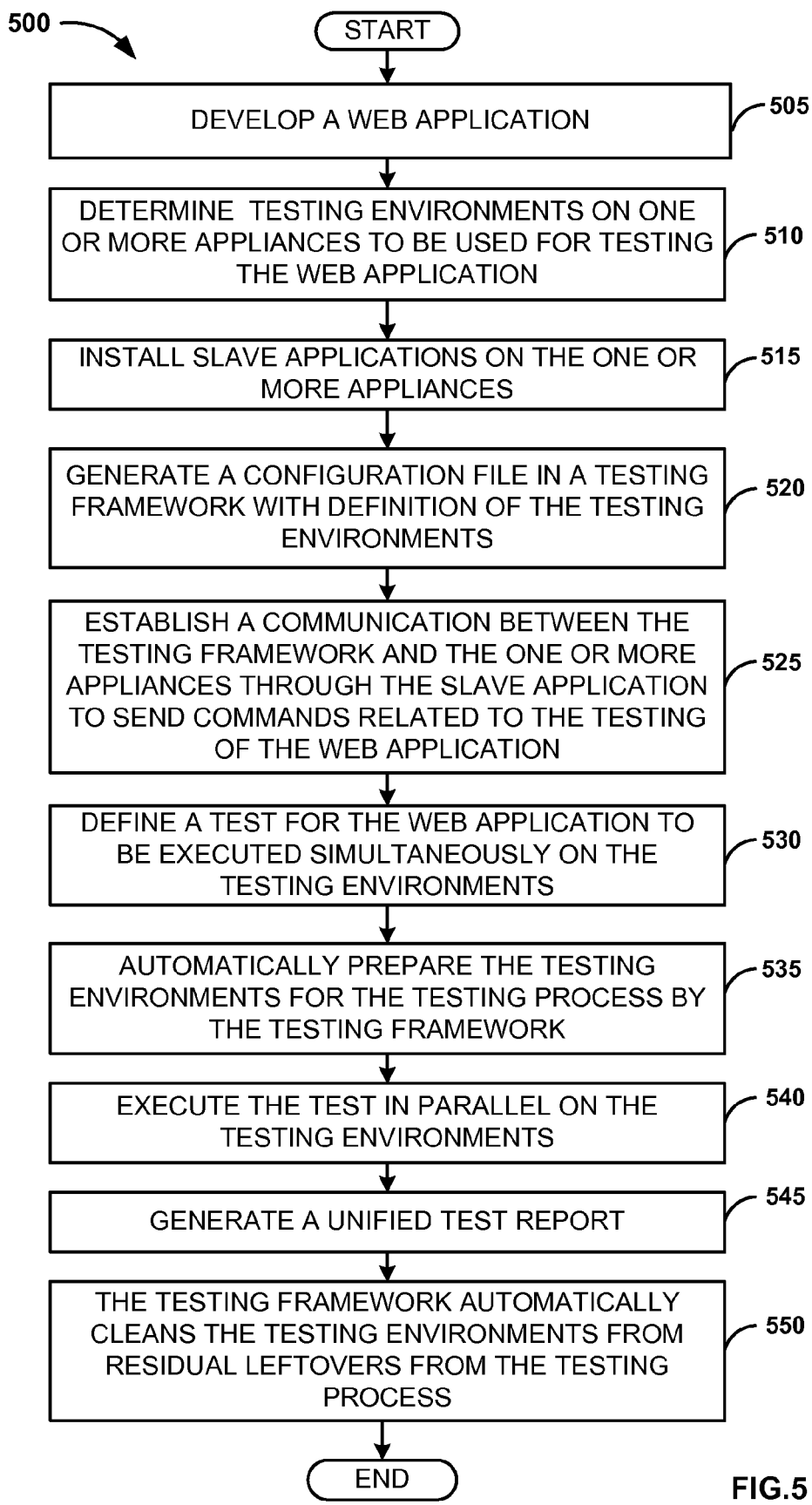
FIG. 5 is a flow diagram illustrating an embodiment of a method for testing web applications on testing environments by a testing framework that is in communication with testing appliances providing the testing environments.

FIG. 5 is a flow diagram illustrating an embodiment of a method 500 for testing web applications on testing environments by a testing framework that is in communication with testing appliances providing the testing environments. At step 505, a web application is developed. Testing environments provided by appliances may be used for testing the web application. At step 510, the testing environments are defined. At step 515, slave applications are installed on the appliances. The testing process may be managed by a testing framework. In one embodiment, the testing framework may be such as testing framework 320. The testing framework may be used for defining the testing environments for use. At step 520, a configuration file is generated within the testing framework with a definition of the testing environments. A communication between the testing framework and the one or more appliances is established at step 525 through pre-installed slave applications on the appliances. At step 530, a test is defined for the web application for simultaneous execution on the defined testing environments. At step 535, the testing framework automatically prepares the testing environments for the testing process. The preparation steps may be such as the preparation steps included at step 420, FIG. 4. At step 540, the test is executed in parallel on the defined testing environments. A unified test report is generated at step 545. At step 550, the testing framework automatically cleans the testing environments from residual leftovers from the testing process.

Figure 6:
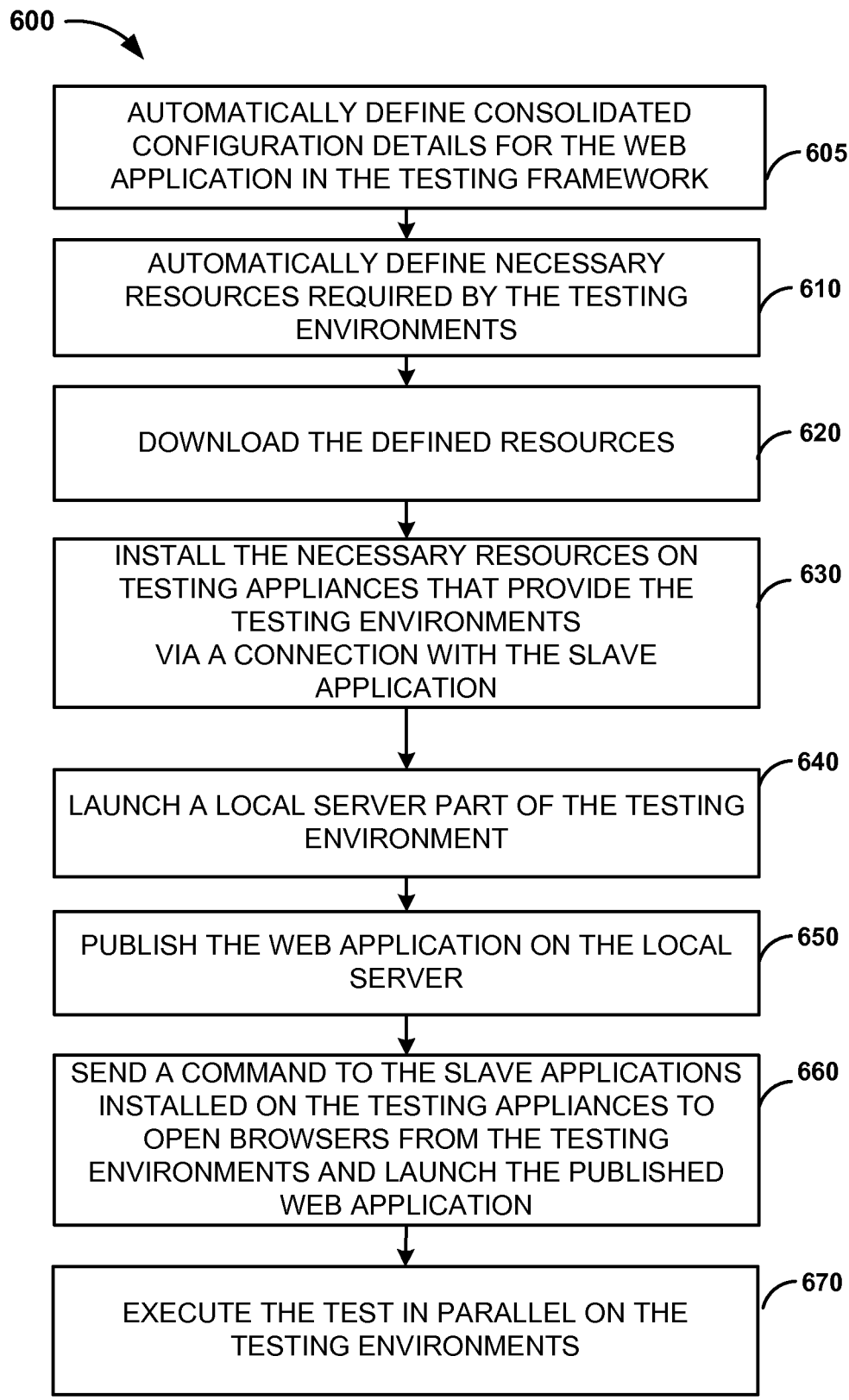
FIG. 6 is a flow diagram illustrating an embodiment of a method for automatic preparation of testing environments by a testing framework for testing of a web application.

FIG. 6 is a flow diagram illustrating an embodiment of a method 600 for automatic preparation of testing environments by a testing framework for testing of a web application. The below described method 600 for automatic preparation of the testing environments may be incorporated as part of the described method 400, and method 500, as part of process step 420 and step 535, respectively. At step 605, the testing framework, such as the testing framework, discussed at FIG. 3, FIG. 4 and FIG. 5, may automatically define at process step 610 the necessary resources required by the testing environments. At step 620, the necessary resources may be downloaded, and at step 630 the necessary resources are installed on testing appliances that provide the testing environments targeted for testing of the web application. At step 640, a local server such as the local server 335, FIG. 3, is launched. The local server may be provided by the testing framework. The testing framework publishes at step 650 the web application on the local server. At step 660, the testing framework sends a command to the installed slave applications on the testing appliances to open browsers from the testing environments provided on each of the testing appliances. Through the send command, the published web application may be loaded within the opened browser. At step 670, the testing framework may execute the test in parallel on the testing environments. In one embodiment, the testing framework processes the test and may send commands through the slave application to the testing environments related to the test, so that the test is executed on each of the environments.

Figure 7:
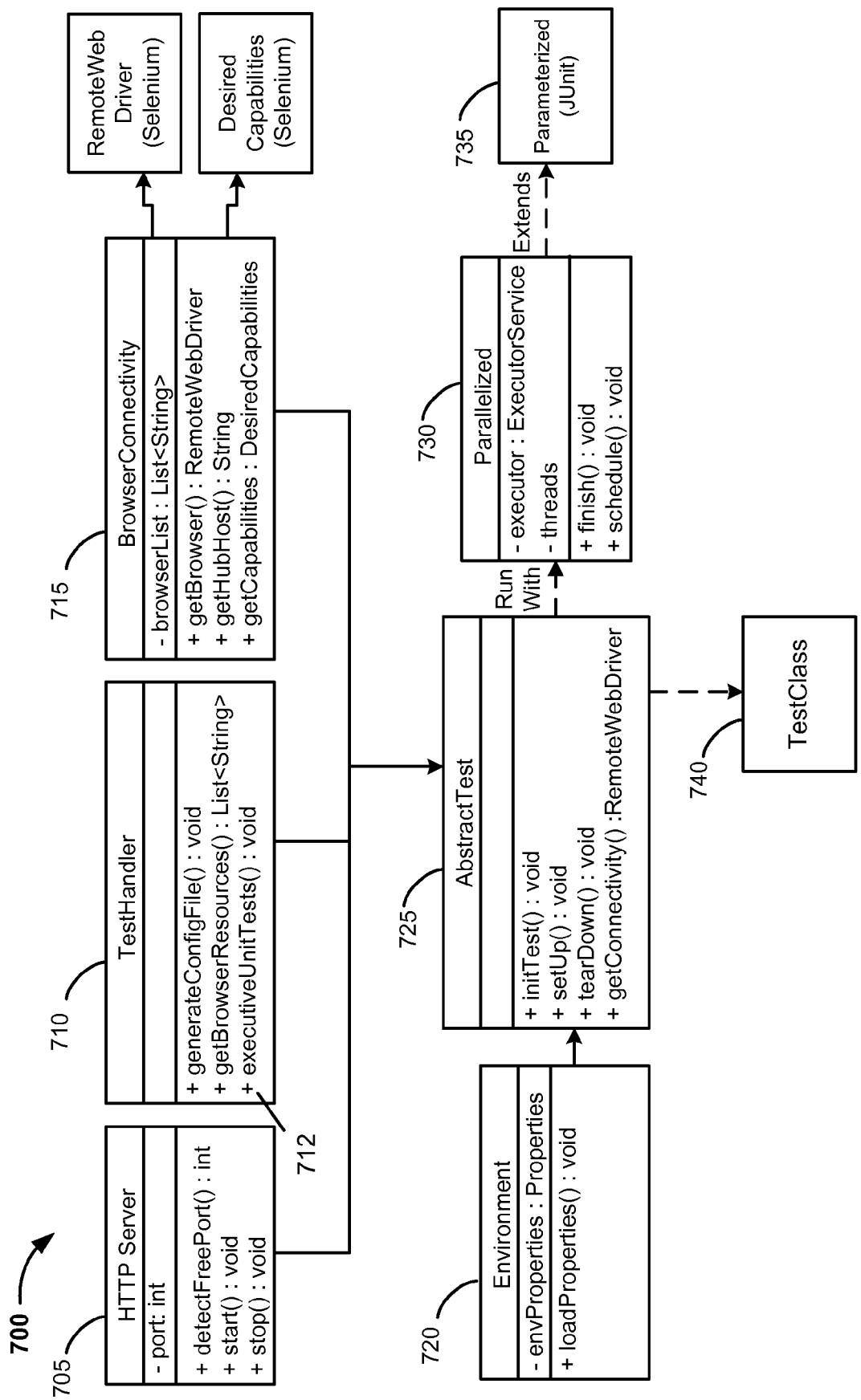
FIG. 7 is a block diagram illustrating an embodiment of an automatic framework class diagram for parallel execution of tests on multiple testing environments.

FIG. 7 is a block diagram illustrating an embodiment of an automatic framework class diagram 700 for parallel execution of tests on multiple testing environments. Table 4 provides a description of the classes from the embodiment of the automatic framework class diagram 700.

TABLE 4

| Class | Description\Responsibility |
|---|---|
| HTTPServer 705 | The HTTPServer 705 class launches a local HTTP server, which serves the web application, having HTML and Javascript files, in order to test the web application. The HTTP Server is launched on a free port, which is detected automatically by scanning a range of ports and one available port is detected. The HTTPServer is stopped and the port is released, when the test is executed and a cleaning phase is ready to start. |
| TestHandler 710 | The TestHandler 710 class is responsible for generating a unified test resources configuration file (such as the file in Table 2) from a list of many configuration files. |

TABLE 4-continued

| Class | Description\Responsibility |
|---|---|
| | The TestHandler 710 class is also responsible for loading specific resources that depend on a specific browser from a testing environment. For example, the TestHandler 710 class loads useful Javascript Application programming interfaces (APIs), which are not available to use in Internet Explorer 8, for example. A Unit Tests execution method "executiveUnitTests( )" 712 may handle technical procedures for loading javascript resources in a specific order and without duplications. |
| BrowserConnectivity 715 | The BrowserConnectivity 715 class saves a browser list in the memory, which may be extracted from the test configuration with test classes (such as the exemplary file in Table 3). The BrowserConnectivity 715 class is responsible to create object called "DesiredCapabilities", which represent the identity of specific testing environment and browser for loading the web application (browser type, browser version and platform). The BrowserConnectivity 715 class may use some APIs of Selenium WebDriver application. The Selenium WebDriver provides APIs in a variety of languages to allow for more control and the application of standard software development practices. |
| Environment 720 | The Environment 720 class is a helper class, which is responsible to load some test environment variables (for example username, password, widget name, button text, etc.) |
| Parallelized 730 | The Parallelized 730 class is responsible for the execution of tests in different threads on the testing environments. Each thread represents the same test with different browser configuration - browser type, browser version and platform. This class extends JUnit Parameterized class. |
| AbstractTest 725 | The AbstractTest 725 class is a base class of test classes 740. The AbstractTest 725 class have a structure including init( ), setup( ) and teardown( ) methods. The AbstractTest 725 class uses the capabilities of the above classes - 705, 710, and 715, and dictates the flow: Setup, then initiation of a Test Execution, then a Test Teardown process (i.e. cleaning process). All the tests classes 740 inherit the AbstractTest 725 class. |
| TestClass 740 | All the TestsClasses 740 inherit the AbstractTest 725 class. |

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
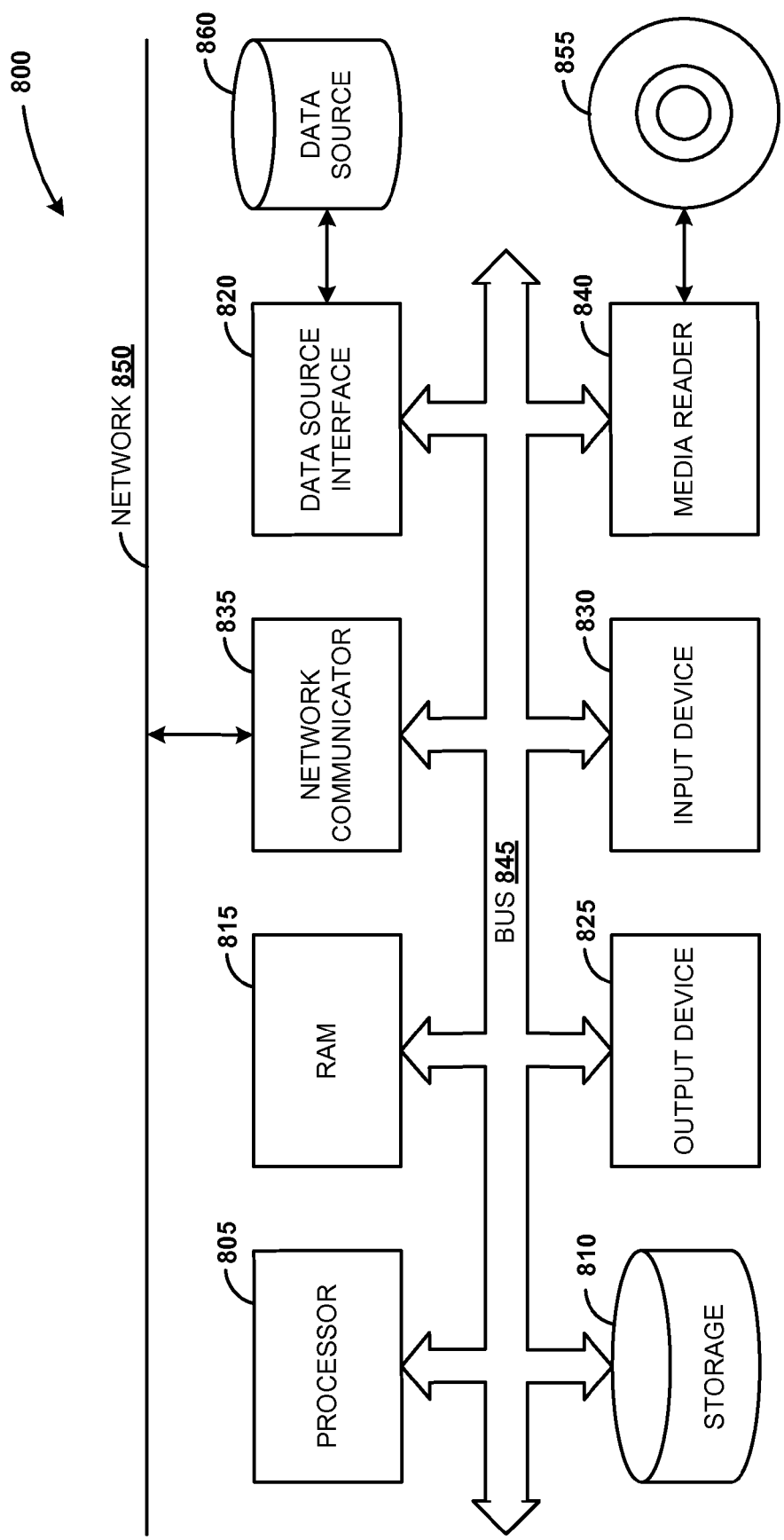
FIG. 8 is a block diagram illustrating an embodiment of a computing system in which the techniques described for automatic parallel testing of a web application on multiple testing environments using a testing framework can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for testing a web application, the method comprising:
    defining testing environments in a testing framework;
    establishing a communication between the testing environments and the testing framework;
    defining a test for the web application for a parallel automatic execution on the defined testing environments;
    the testing framework, preparing the testing environments for the parallel automatic execution of the test, wherein the preparation includes automatic unification of configuration files of the web application with configuration files associated with the test by resolving duplications and dependencies existing in the configuration files of the web application and the configuration files associated with the test;

executing the test in parallel on the prepared testing environments by the testing framework, wherein the testing framework controls the testing environments through slave applications installed on appliances that provide the testing environments; and generating a unified test report from the parallel automatic execution of the test.

2. The method of claim 1, wherein the testing environments are defined in a configuration file in the testing framework.

3. The method of claim 1, wherein defining the testing environments comprise at least a definition of a software platform, a browser type, and a browser version.

4. The method of claim 1, wherein the prepared testing environments comprise a browser for displaying the web application.

5. The method of claim 1, wherein preparing the testing environments for the parallel automatic execution of the test further comprises:
based on the automatic unification mechanism, defining consolidated configuration details of the web application by the testing framework to execute the test in parallel on the testing environments;
defining and providing resources required by the testing environments for testing the web application;
launching a local server part of the testing framework to publish the web application; and
publishing the web application on the local server.

6. The method of claim 1, wherein preparing the testing environments for the test further comprises launching the web application from the testing environments.

7. The method of claim 1, wherein the slave applications receive commands to open and close the browser from the prepared testing environments to load the web application before executing the test.

8. The method of claim 1, wherein the testing framework cleans the prepared testing environments after executing the test.

9. A computer system, comprising:
one or more processors;
appliances to provide testing environments comprising a browser for displaying a web application for testing;
a testing framework to:
define the testing environments to be configured on the appliances;
establish a communication between the testing framework and the appliances;
define a test for the web application for a parallel automatic execution on
prepare the testing environments for the parallel automatic execution of the test, wherein the web application is launched from the testing environments, and wherein the preparation includes automatic unification of configuration files of the web application with configuration files associated with the test by resolving duplications and dependencies existing in the configuration files of the web application and the configuration files associated with the test;
execute the test in parallel on the prepared testing environments by the testing framework, wherein the testing framework controls the testing environments through slave applications installed on appliances that provide the testing environments; and
generate a unified test report with test results from the parallel automatic execution of the test.

10. The system of claim 9, wherein the testing environments are specified at least with a software platform, a browser type, and a browser version, and wherein an appliance from the appliances includes a set of testing environments from the testing environments.

11. The system of claim 9, the testing framework when preparing the testing environments is further operable to:
based on the automatic unification mechanism, define consolidated configuration details of the web application to execute the test in parallel on the testing environments;
define and provide resources required by the testing environments for testing the web application;
launch a local server part of the testing framework to publish the web application; and
publish the web application on the local server.

12. The system of claim 9, wherein the slave applications receive commands to open and close the browser from the prepared testing environments to load the web application before executing the test.

13. A non-transitory computer readable storage medium including executable instructions, which when executed by a computer, cause the computer to:
define testing environments in a testing framework, wherein definition of the testing environments comprise at least a definition of a software platform, a browser type, and a browser version;
establish a communication between the testing environments and the testing framework;
define a test for the web application for a parallel automatic execution on the defined testing environments;
prepare the testing environments for launching the web application and executing the test in parallel, wherein the preparation includes automatic unification of configuration files of the web application with configuration files associated with the test by resolving duplications and dependencies existing in the configuration files of the web application and the configuration files associated with the test;
execute the test in parallel on the one or more prepared testing environments by the testing framework, wherein the testing framework controls the testing environments through slave applications installed on appliances that provide the testing environments; and
generate a unified test report with test results from the parallel automatic execution of the test.

14. The computer-readable medium of claim 13, wherein the testing environments are defined in a configuration file in the testing framework.

15. The computer-readable medium of claim 13, wherein the instructions to prepare the testing environments for launching the web application and executing the test in parallel further comprise instructions, which when executed by a computer, cause the computer to:
based on the automatic unification mechanism, define consolidated configuration details of the web application by the testing framework to execute the test in parallel on the testing environments;
define and providing resources required by the testing environments for testing the web application;
launch a local server part of the testing framework to publish the web application;
publish the web application on the local server; and
launch the web application from the testing environments.

16. The computer-readable medium of claim 13, wherein the slave applications receive commands to open and close a browser from the prepared testing environments on the appliances to load the web application before executing the test.

17. The computer-readable medium of claim 13, wherein the testing framework cleans the prepared testing environments after executing the test.

\* \* \* \* \*